United States Patent
Paranjpe et al.

(10) Patent No.: US 11,695,855 B2
(45) Date of Patent: Jul. 4, 2023

(54) USER GENERATED PLUGGABLE CONTENT DELIVERY NETWORK (CDN) SYSTEM AND METHOD

(71) Applicant: MARGO NETWORKS PVT. LTD., Mumbai (IN)

(72) Inventors: Rohit Paranjpe, Mumbai (IN); Ripunjay Bararia, Mumbai (IN)

(73) Assignee: MARGO NETWORKS PVT. LTD.

( * ) Notice: Subject to any disclaimer, the term of this patent is extended or adjusted under 35 U.S.C. 154(b) by 0 days.

(21) Appl. No.: 17/745,340

(22) Filed: May 16, 2022

(65) Prior Publication Data

US 2022/0368776 A1 Nov. 17, 2022

(30) Foreign Application Priority Data

May 17, 2021 (IN) .............................. 202121022074

(51) Int. Cl.
*H04L 67/5681* (2022.01)
*H04L 41/0806* (2022.01)

(52) U.S. Cl.
CPC ...... *H04L 67/5681* (2022.05); *H04L 41/0809* (2013.01)

(58) Field of Classification Search
CPC . H04L 67/5681; H04L 41/0809; H04L 65/80; H04L 65/4069; H04L 65/602; H04L 67/10
USPC ........................................................ 709/213
See application file for complete search history.

(56) References Cited

U.S. PATENT DOCUMENTS

| | | |
|---|---|---|
| 7,127,713 B2 | 10/2006 | Davis |
| 7,307,956 B2 | 12/2007 | Kaplan et al. |
| 7,395,355 B2 | 7/2008 | Afergan et al. |
| 7,505,944 B2 | 3/2009 | Moulart et al. |
| 7,752,258 B2 | 7/2010 | Lewin et al. |
| 7,860,950 B2 | 12/2010 | Menon et al. |
| 7,921,259 B2 | 4/2011 | Elazary et al. |
| 8,516,529 B2 | 8/2013 | LaJoie et al. |
| 8,737,357 B2 | 5/2014 | Denny et al. |
| 8,746,553 B2 | 6/2014 | Burdett |
| 8,838,480 B2 | 9/2014 | Damola et al. |
| 8,843,758 B2 | 9/2014 | Dharmarajan et al. |
| 8,937,903 B2 | 1/2015 | Bari et al. |
| 9,001,682 B2 | 4/2015 | Kovvali et al. |
| 9,003,436 B2 | 4/2015 | Tidwell et al. |

(Continued)

FOREIGN PATENT DOCUMENTS

| | | |
|---|---|---|
| CN | 101741869 B | 4/2013 |
| CN | 103782571 A | 5/2014 |

(Continued)

OTHER PUBLICATIONS

US 8,782,123 B2, 07/2014, Seed et al. (withdrawn)

(Continued)

*Primary Examiner* — Glenford J Madamba
(74) *Attorney, Agent, or Firm* — Manatt, Phelps & Phillips, LLP

(57) ABSTRACT

A pluggable CDN system and method include an edge node that is installed at each premises and caches/serves content/data to that premises that may be an individual user or a community. The edge node may use a hybrid push/pull caching scheme and may serve data to users even without any Internet connectivity.

12 Claims, 8 Drawing Sheets

(56) References Cited

U.S. PATENT DOCUMENTS

| | | |
|---|---|---|
| 9,105,021 B2 | 8/2015 | Tobin |
| 9,173,158 B2 | 10/2015 | Varma |
| 9,282,352 B2 | 3/2016 | McDysan et al. |
| 9,367,857 B2 | 6/2016 | Linden et al. |
| 9,374,619 B2 | 6/2016 | Andreasen et al. |
| 9,419,845 B2 | 8/2016 | Wainner et al. |
| 9,497,496 B1 | 11/2016 | Corley et al. |
| 9,565,117 B2 | 2/2017 | Dahod et al. |
| 9,584,598 B2 | 2/2017 | Phillips et al. |
| 9,661,374 B1 | 5/2017 | Erdmann et al. |
| 9,674,239 B2 | 6/2017 | Wong et al. |
| 9,871,850 B1 | 1/2018 | Brandwine et al. |
| 9,875,493 B2 | 1/2018 | Nuzzi |
| 9,904,934 B1 | 2/2018 | Kumar et al. |
| 9,911,154 B2 | 3/2018 | Baker et al. |
| 10,009,741 B1 | 6/2018 | Burcham et al. |
| 10,019,724 B2 | 7/2018 | Patel |
| 10,045,070 B2 | 8/2018 | Markley et al. |
| 10,049,349 B1 | 8/2018 | Grassadonia et al. |
| 10,055,721 B1 | 8/2018 | Mocko et al. |
| 10,097,503 B2 | 10/2018 | Bergman |
| 10,110,710 B2 | 10/2018 | Cook et al. |
| 10,134,026 B1 | 11/2018 | Koeppel |
| 10,142,444 B2 | 11/2018 | Reynolds et al. |
| 10,200,480 B2 | 2/2019 | Zhang et al. |
| 10,248,975 B2 | 4/2019 | Garcia-Martinez et al. |
| 10,470,060 B1 | 11/2019 | Paranjpe et al. |
| 10,496,979 B2 | 12/2019 | Taveau et al. |
| 10,554,748 B2 | 2/2020 | Sivasubramanian et al. |
| 10,630,769 B2 | 4/2020 | Carver et al. |
| 10,693,813 B1 | 6/2020 | Jacob Da Silva et al. |
| 10,715,411 B1 | 7/2020 | Jacob Da Silva et al. |
| 10,878,404 B2 | 12/2020 | Lu et al. |
| 10,931,778 B2 | 2/2021 | Paranjpe et al. |
| 2001/0023180 A1 | 9/2001 | Sauer |
| 2002/0143798 A1 | 10/2002 | Lisiecki et al. |
| 2002/0194171 A1 | 12/2002 | Judd et al. |
| 2004/0093419 A1 | 5/2004 | Weihl et al. |
| 2004/0205162 A1 | 10/2004 | Parikh |
| 2004/0232221 A1 | 11/2004 | Beenau |
| 2005/0021462 A1 | 1/2005 | Teague et al. |
| 2005/0027543 A1 | 2/2005 | Labrou |
| 2006/0036493 A1 | 2/2006 | Aufricht et al. |
| 2007/0094691 A1 | 4/2007 | Gazdzinski |
| 2007/0106626 A1 | 5/2007 | Mundie et al. |
| 2007/0124662 A1 | 5/2007 | Streuter et al. |
| 2007/0255617 A1 | 11/2007 | Maurone et al. |
| 2008/0010192 A1 | 1/2008 | Rackley, III |
| 2008/0049630 A1 | 2/2008 | Kozisek et al. |
| 2008/0102947 A1 | 5/2008 | Hays et al. |
| 2008/0162589 A1 | 7/2008 | Rodeheffer et al. |
| 2008/0215747 A1 | 9/2008 | Menon et al. |
| 2008/0222281 A1 | 9/2008 | Dilley et al. |
| 2008/0262941 A1 | 10/2008 | Feiner |
| 2009/0030765 A1 | 1/2009 | Cameron et al. |
| 2009/0094160 A1 | 4/2009 | Webster et al. |
| 2009/0132365 A1 | 5/2009 | Gruenhagen et al. |
| 2009/0132395 A1 | 5/2009 | Lam et al. |
| 2009/0157537 A1 | 6/2009 | Miller |
| 2009/0164286 A1 | 6/2009 | Gupta et al. |
| 2009/0164329 A1 | 6/2009 | Bishop |
| 2009/0164330 A1 | 6/2009 | Bishop |
| 2009/0254661 A1 | 10/2009 | Fullagar et al. |
| 2009/0287515 A1 | 11/2009 | Mehta et al. |
| 2009/0323693 A1 | 12/2009 | Yin et al. |
| 2010/0074267 A1 | 3/2010 | Ladd |
| 2010/0121715 A1 | 5/2010 | Shiojima |
| 2011/0078079 A1 | 3/2011 | Shin |
| 2011/0082724 A1 | 4/2011 | Le Chevalier et al. |
| 2011/0087602 A1 | 4/2011 | Rutman |
| 2011/0105150 A1 | 5/2011 | Moon et al. |
| 2011/0161462 A1 | 6/2011 | Hussain et al. |
| 2011/0314145 A1 | 12/2011 | Raleigh et al. |
| 2012/0054837 A1 | 3/2012 | Yoon |
| 2012/0096106 A1 | 4/2012 | Blumofe et al. |
| 2012/0166618 A1 | 6/2012 | Dahod et al. |
| 2012/0215915 A1 | 8/2012 | Sakata et al. |
| 2012/0231844 A1 | 9/2012 | Coppinger |
| 2012/0330769 A1 | 12/2012 | Arceo |
| 2013/0013688 A1 | 1/2013 | Wang et al. |
| 2013/0024363 A1 | 1/2013 | Cunescu et al. |
| 2013/0085864 A1 | 4/2013 | Ahmed et al. |
| 2013/0107732 A1 | 5/2013 | O'Donnell et al. |
| 2013/0110984 A1 | 5/2013 | Raciborski et al. |
| 2013/0132504 A1 | 5/2013 | Kohli et al. |
| 2013/0238503 A1 | 9/2013 | Patel |
| 2013/0346305 A1 | 12/2013 | Mendes |
| 2014/0082126 A1 | 3/2014 | Kim et al. |
| 2014/0094159 A1 | 4/2014 | Raleigh et al. |
| 2014/0095320 A1 | 4/2014 | Sivaramakrishnan et al. |
| 2014/0115606 A1 | 4/2014 | Hamzata et al. |
| 2014/0229277 A1 | 8/2014 | Khambete et al. |
| 2014/0250191 A1 | 9/2014 | Altman et al. |
| 2014/0279047 A1 | 9/2014 | Wang et al. |
| 2014/0282725 A1 | 9/2014 | Brandstetter |
| 2014/0373049 A1 | 12/2014 | Carr et al. |
| 2015/0143397 A1 | 5/2015 | Bies |
| 2015/0172135 A1 | 6/2015 | Coppola et al. |
| 2015/0237512 A1 | 8/2015 | Chang et al. |
| 2015/0278796 A1 | 10/2015 | Jiang |
| 2015/0310421 A1 | 10/2015 | Xie |
| 2015/0319214 A1* | 11/2015 | Yu ........................ H04L 67/63 709/219 |
| 2015/0339318 A1 | 11/2015 | O'Toole et al. |
| 2015/0339667 A1 | 11/2015 | Dua |
| 2015/0341705 A1 | 11/2015 | Rauhe et al. |
| 2015/0350018 A1 | 12/2015 | Hui et al. |
| 2015/0371215 A1 | 12/2015 | Zhou |
| 2016/0034876 A1 | 2/2016 | Speiser |
| 2016/0042344 A1 | 2/2016 | Thimmana et al. |
| 2016/0110718 A1 | 4/2016 | Jajara et al. |
| 2016/0191651 A1 | 6/2016 | Balakrishnan et al. |
| 2016/0196582 A1 | 7/2016 | Stone et al. |
| 2016/0210622 A1 | 7/2016 | Yang et al. |
| 2016/0248879 A1 | 8/2016 | Fliam et al. |
| 2016/0300272 A1 | 10/2016 | Ao et al. |
| 2016/0328740 A1 | 11/2016 | Chan et al. |
| 2016/0337206 A1 | 11/2016 | Bugenhagen et al. |
| 2016/0371716 A1 | 12/2016 | Aitenbichler |
| 2017/0032345 A1 | 2/2017 | Gideon et al. |
| 2017/0142024 A1 | 5/2017 | Fromentoux et al. |
| 2017/0155739 A1 | 6/2017 | Ao |
| 2017/0178090 A1 | 6/2017 | Sarin |
| 2017/0187837 A1 | 6/2017 | Ao |
| 2017/0215042 A1 | 7/2017 | Lee |
| 2017/0223029 A1 | 8/2017 | Sharma et al. |
| 2017/0228766 A1 | 8/2017 | Mahajan |
| 2017/0255924 A1 | 9/2017 | White |
| 2017/0262902 A1 | 9/2017 | Weston et al. |
| 2018/0068290 A1 | 3/2018 | Xia |
| 2018/0068293 A1 | 3/2018 | Dunne |
| 2018/0077258 A1 | 3/2018 | Newton et al. |
| 2018/0124143 A1 | 5/2018 | Bologh |
| 2018/0124646 A1 | 5/2018 | Thubert et al. |
| 2018/0184132 A1 | 6/2018 | Mao |
| 2018/0184477 A1 | 6/2018 | Paredes et al. |
| 2018/0232732 A1 | 8/2018 | Rodrigues et al. |
| 2018/0310279 A1 | 10/2018 | Pathak et al. |
| 2018/0317067 A1 | 11/2018 | Ameixieira |
| 2019/0028743 A1 | 1/2019 | He et al. |
| 2019/0069003 A1 | 2/2019 | Panagos et al. |
| 2019/0114631 A1 | 4/2019 | Madhu et al. |
| 2019/0122202 A1 | 4/2019 | Sun |
| 2019/0130386 A1 | 5/2019 | Bhat |
| 2019/0139029 A1 | 5/2019 | Kadiwala |
| 2019/0141561 A1 | 5/2019 | Altay et al. |
| 2019/0166395 A1 | 5/2019 | Li |
| 2019/0197539 A1 | 6/2019 | Chang |
| 2019/0268392 A1 | 8/2019 | Santangelo et al. |
| 2019/0274082 A1 | 9/2019 | Vemuri et al. |
| 2020/0082404 A1 | 3/2020 | Zhang et al. |
| 2020/0126062 A1 | 4/2020 | Sun |
| 2020/0153932 A1 | 5/2020 | Bao et al. |
| 2020/0167742 A1 | 5/2020 | Zhai et al. |

(56) References Cited

U.S. PATENT DOCUMENTS

| | | | |
|---|---|---|---|
| 2020/0167746 A1 | 5/2020 | Yu et al. |
| 2020/0220942 A1 | 7/2020 | Paranjpe et al. |
| 2020/0221365 A1 | 7/2020 | Paranjpe et al. |
| 2020/0242616 A1 | 7/2020 | Waughtal |
| 2020/0250644 A1 | 8/2020 | Oberholtzer |
| 2021/0065174 A1 | 3/2021 | Singh |
| 2021/0097521 A1 | 4/2021 | Kumar |
| 2021/0103910 A1 | 4/2021 | Subramaniam |
| 2021/0243072 A1 | 8/2021 | Peterson |
| 2021/0289039 A1 | 9/2021 | Paranjpe et al. |
| 2022/0020016 A1 | 1/2022 | Scott |
| 2022/0224594 A1 | 7/2022 | Peterson |

FOREIGN PATENT DOCUMENTS

| | | | | |
|---|---|---|---|---|
| CN | 106790552 A | 5/2017 | | |
| CN | 107852609 A | 3/2018 | | |
| CN | 107645475 B | 12/2019 | | |
| EP | 2815541 A1 | 12/2014 | | |
| EP | 3382975 A1 * | 10/2018 | ............ | G06N 20/00 |
| EP | 3 557 843 A1 | 10/2019 | | |
| IN | 201921000982 A | 1/2020 | | |
| KR | 100572478 B1 | 12/2006 | | |
| KR | 20070067005 A | 6/2007 | | |
| KR | 20130102792 A | 9/2013 | | |
| KR | 101574074 B1 | 12/2015 | | |
| WO | WO2006133655 A1 | 12/2006 | | |
| WO | WO2008022339 A2 | 2/2008 | | |
| WO | WO2012000438 A1 | 1/2012 | | |
| WO | WO2012131287 A1 | 10/2012 | | |
| WO | WO2013052028 A2 | 4/2013 | | |
| WO | WO2013123162 A1 | 8/2013 | | |
| WO | WO2013170864 A1 | 11/2013 | | |
| WO | WO2015090360 A1 | 6/2015 | | |
| WO | WO 2015-181591 A1 | 12/2015 | | |
| WO | WO2016043839 A1 | 3/2016 | | |
| WO | WO2018027984 A1 | 2/2018 | | |
| WO | WO2018158729 A1 | 4/2018 | | |
| WO | WO2018087275 A1 | 5/2018 | | |
| WO | WO2018215681 A1 | 11/2018 | | |
| WO | WO 2019/123273 A1 | 6/2019 | | |
| WO | WO-2019213169 A1 * | 11/2019 | ............ | G06N 20/00 |
| WO | WO2020144701 A1 | 7/2020 | | |

OTHER PUBLICATIONS

Bhardwaj et al., "AppFlux: Taming App Delivery Streaming," Georgia Institute of Technology, pp. 1-14.

Kalva et al."Techniques for Improving the Capacity of Video-on Demand Systems," Proceeds of 29th Annual Hawaii international Conference on System Sciences, 1996, pp. 309-315.

Lai et al., "A Hierarchical Network Storage Architecture for Video-on-Demand Services," IEEE Transactions on Broadcasting, vol. 43:2, (Jun. 1997), pp. 145-154.

Little, T.D.C. et al., "Prospects for Interactive Video-on-Demand," Multimedia Communications Laboratory, MCL Technical Report, (Feb. 15, 1994), pp. 1-22.

"How to Auto Switch between WiFi and Mobile the Smart Way," (Dec. 2018), 6 pages, Speedicyhttps://speedify.com/blog.

Kos et al., "CATV Broadband Technologies," EC-VIP-MC 2003, 4th EURASIP Conference, (2003), pp. 829-834.

Alloush et al., "Initial use cases, scenarios and requirements," CogNet, (Nov. 30, 2015), Ver. 0.9, pp. 1-107.

Velasco et al., "A Service-Oriented Hybrid Access Network and Cloud Architecture," pp. 8.

Bulander et al., "Comparison of Different Approaches for Mobile Advertising," The Second IEEE international Workshop on Mobile Commerce and Services (WMCS '05) Jul. 19, 2005, Munich, Germany, IEEE Computer Society, pp. 174-182, 10 pages.

Callejo et al., "Opportunities and Challenges of Ad-based Measurements from the Edge of the Network," © 2017 Association for Computing Machinery. ACM ISBN 978-1-4503-5569-8/17/11, Dec. 1, 2017, Paio Alto, CA, USA © 2017 Association for Computing Machinery. ACM ISBN, 978-1-4503-5569-8/17/11, 7 pages, https://doi.org/10.1145/3152434.3152895.

Khan et al., "CAMEO:A Middleware for Mobile Advertisement Delivery," Network Architecture and Design]: Wireless Communication, Research performed by author as a Research Fellow at Singapore Management University, Jun. 25-28, 2013, 13 pages.

Toubiana et al., "Adnostic: Privacy Preserving Targeted Advertising," NYU.edu and stanford.edu, supported by the NSF Portia and Muri Presidio projects, 23 pages.

Adi et al., "Secured Multi-Identity Mobile Infrastructure and Offline Mobile-Assisted Micro-Payment Application," WCNC 2004 / IEEE Cornmunications Society, 4 pages.

Kiran et al., "Building Robust m-Commerce Payment System on Offline Wireless Network," Dept of Electronics & Communication Eng. Sai Vidya Institute of Technology and Electronics & Communication Eng. UVCE, 3 pages.

Van Damme et al., "Offline NFC Payments with Electronic Vouchers," Dept. Electrical Engineering-ESAT/SCD/IBBT-COSIC, Katholieke Universiteit Leuven, Kasteelpark Arenberg 10, 3001 Heverlee-Leuven, Belgium, MobiHeld'09. Aug. 17, 2009, Barcelona, Spain, 6 pages.

Wikipedia, the Free Encyclopedia, Distributed Computing, internet Archive WayBack Machine Capture date of Dec. 10, 2013, Internet Archive WayBack Machine (Year: 2013), 11 pages.

Mu, Su. "Application networking for pervasive content delivery." (2008). https://core.ac.uk/download/pdf/48630854.pdf. Disclosing CDN Components with a Network (Fig 2.2, p. 16 with Section "2.4.1 Open Pluggable Edge Service" from pp. 26-28).

Frangoudis,"An architecture for on-demand service deployment, over a telco CDN," IEEE ICC 2016 Next-Gen IRISA/University of Rennes 1, France, Aalto University, Finland, 6 pgs.

Frangoudis et aL. "CDN-as-a-Service Provision over a Telecom Operator's Cloud," IEEE Transactions on Network and Service Management, IEEE, Dec. 9, 2017, 4(3), pp. 702-716, 16 pgs.

Griwodz et al. "Content Distribution Infrastructures," Jul. 2, 2004, Dagstuhl Seminar Proceedings 04201 http://drops.dagstuhl.de/opus/volltexte/2006/502, 6 pgs.

Hamzeh et al "Residential Network Architectures and Services," Cable Networks, Services, and Management, 1st Edition, 2015 Edited by Mehmet Toy, 372 pgs.

Huang, Shufeng, "A HyperNet Architecture" (2014), Theses and Dissertations—Computer Science. 18. https://uknowledge.uky.edu/cs_etds/18, 165 pgs.

Ravindran, "A Management Framework for Service Personalization," 2002, SOMA Networks Dept. of Electrical and Computer Engineering,Ryerson University, Toronto, Canada, 13 pgs.

Tyson, "A Topology Aware Clustering Mechanism" 2007, Computing Department Lancaster University, 6 pages.

Yala, "QoE-Aware Computing Resource Allocation for CDN-as-a-Service Provision" IRISA/University of Rennes 1, France, EURECOM Institute, Sophia Antipolis, France, 2016, 6 pgs.

\* cited by examiner

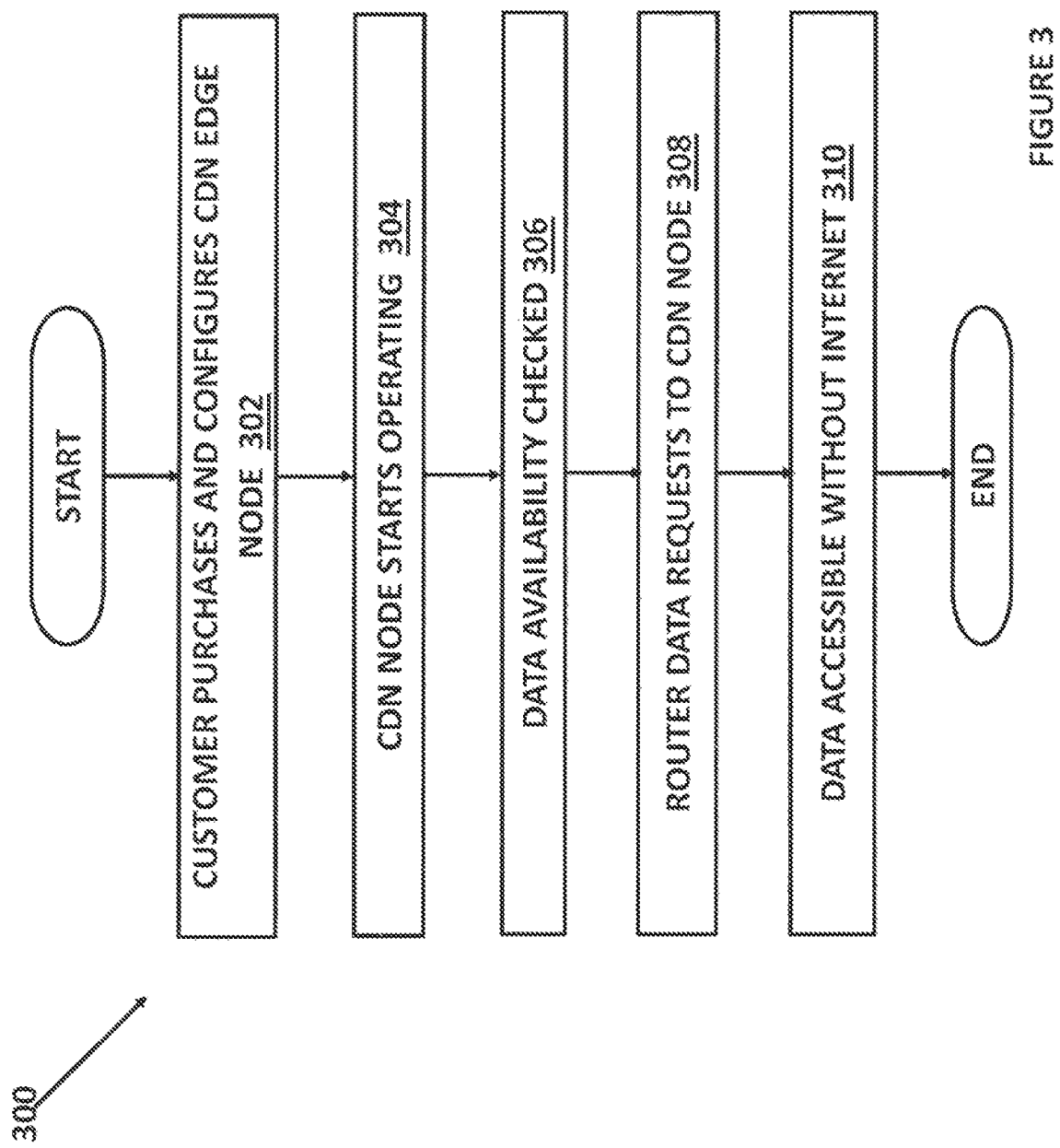

CDN Edge Management Dashboard

- Home
- My Edges
- Configurations
- Reports

Add New Edge — 208

| Field | Value |
|---|---|
| Edge Serial Number | MXA819AJ72 |
| Edge Identification Number | John's Home |
| Mobile Number | India (+91) • 9898989898 |
| | India (+91) ▾ |
| Network Details | |
| Edge Status | Plugged in |
| Edge IP | 130.130.1.1 |
| Edge MAC Address | 00:1B:44:11:3A:37 |

[Reset] [Save] — 502

FIGURE 5A

USER GENERATED PLUGGABLE CONTENT DELIVERY NETWORK (CDN) SYSTEM AND METHOD

PRIORITY CLAIMS/RELATED APPLICATIONS

This application claims priority under 35 USC 119 to Indian Patent Application 202121022074, filed May 17, 2021 that is incorporated herein by reference.

FIELD

The disclosure relates to a content delivery system and in particular to a content delivery system (CDN) in which a user can install a CDN edge node within their network on their premises, by themselves.

BACKGROUND

People access the Internet via a wired or wireless medium. This wire or wireless medium forms the last mile of a worldwide network of interconnected mediums, responsible for transmitting data across the world (commonly known as the Internet). To access Internet services, end-users subscribe to an Internet Service Provider (ISP) to buy a portion of their bandwidth. Bandwidth is the volume of data that can be sent over a connection in a measured amount of time. The ISPs, in turn, are connected to Internet Exchanges, which act as mediums through which data packets containing requests from end-users are transmitted to reach the inter-continental under-water cables. These inter-continental cables convey the data packets from end-users to their pertinent one or more data centers and then the information received from the one or more data centers to the end users, via the same route.

The Internet bill that people pay has a last mile portion that is a disproportionately high part of the total charge of the Internet access bill. The amount charged by the ISPs for utilization of their bandwidth is much higher than the combined cost of the rest of the access network. Each request, like Web searching, movie streaming, or video calling; originating from a user, utilizes some amount of bandwidth provided by an ISP, and has a cost associated.

In this age of increasing demand for Internet services, ISPs and Telecom Service Providers (TSP) have been deploying caching servers to optimize their bandwidth utilization. Optimizing the overall bandwidth utilization has resulted in reducing their operating cost. For example, if a hundred people are all watching the same sports highlights over a network, it results in using a lot of bandwidth. By having caching servers deployed, the ISP serves the request only once instead of relaying it a 100-times over to each user since the content to each user is delivered by the caching servers.

Today, although the last mile constitutes about 20% of the overall Internet network, it accounts for 80% of the total cost that is incurred towards maintaining the Internet infrastructure, as per industry data. FIG. 1 illustrates the current architecture implementing caching via geographically distributed CDN edge servers that are all connected to the original/origin server for the CDN.

The last mile of the Internet is the reason why people experience slow Internet connection. The throughput and the latency for each request are the most important parameters associated with Quality of Service (QoS) and user experience. Throughput is the total volume of data that is actually transmitted over a connection in a measured amount of time.

The factors, mentioned next, impact the overall QoS for the end-users; of which, almost all of them are arising at the last mile.

Another parameter arising at the last mile is a data cap, also known as a bandwidth cap, in which an Internet service provider enforces its own restriction on the transfer of data over a network to limit customers' usage of their services. Exceeding the data cap would typically require the customer to pay additional charges or experience lower throughput until the term of the subscription, also classified as Fair Usage Policy (FUP). Another factor arising in the last mile is artificial congestion that occurs as a result of ISPs deliberately slowing down certain content or certain services through their network for vested interests. Yet another parameter arising in the last mile is the hardware or equipment deployed in the last mile. Whether the last mile architecture is all fiber, fiber and copper, or fiber and coaxial cable, a last-mile network provider can choose to intentionally deploy equipment that determines the bandwidth capacity of the line into the end-user premise, thus affecting the throughput the last mile can achieve.

Another parameter arising in the last mile is packet loss and errors where packet loss can occur due to network congestion at the ISPs, or because of the unreliability of wireless networks. There could be other technical errors causing packet loss, thus affecting the ultimate experience of customers. Another parameter is network congestion in which, as the maximum amount of data that can be transmitted through a cable per unit of time is dependent on the width of the cable, the term that is used in Internet terminology to denote the speed of data transfer through a given cable is bandwidth. Because the flow of data cannot be scaled up beyond the limit set by the cable's bandwidth, people tend to experience slow Internet connection during heavy Internet-traffic hours. The middle mile of the Internet also faces challenges that reduce the throughput of the network.

Another parameter that affects the last mile are peering agreements that are mutually executed, voluntary interconnections between various Internet networks to exchange traffic among the users of each network. If the last mile ISP does not have effective peering agreements, it affects the performance of the last mile network since it does not attempt bypassing potential bottlenecks with a "direct" path, thus, leading to congestion. Finally, distance is a parameter that affects the last mile. In particular, the distance a data packet has to travel is the biggest barrier in improving the throughput of a network, as longer distances require longer durations for request fulfilment. The conductivity of cabling or the type of cabling has a reduced efficacy if the distance that the data needs to travel cannot be shortened.

Content Distribution Networks (CDN) came into existence in the late 1990s as a means for improving the bottlenecks on the Internet and thus the performance, by distributing content across a geographically distributed network of caching servers deployed at data centers or ISP locations as shown in FIG. 1. The complexity in setting up a caching server lies in its configurations. CDN servers are difficult to configure and set up so as to allow them to optimize network efficiency, especially in a distributed environment. Routing protocols, caching mechanisms, expiration rules, purge behavior, etc. may differ between caching servers, leading to differential experience for the users and the applications requesting assets from a caching server.

To solve the above technical problems with the last mile, content owners or companies pay traditional, commercial CDN operators to deliver their content to their end-users. In turn, a CDN partners with Internet service providers (ISPs), carriers, and network operators for hosting its caching servers at their data centers, thus bringing content closer to the end-users and improving the latency for the fulfillment of content requests. These commercial CDNs also manage the caching algorithms that are proprietary and are pre-configured by the commercial CDN-provider for optimal performance. Other companies, such as Google, Facebook and Netflix have set up their private CDNs for achieving the same objective—providing users the highest-quality access. They achieve this by partnering with ISPs to deliver their content at a lower latency by localizing the traffic through their caching server deployments and having an open-peering policy at their inter-connection locations.

The limitation with the current CDN deployments (whether public or private) is that irrespective of the distance at which the caching server is located from the user, it still needs connectivity to the Internet to serve the content. Internet connectivity has its own set of limitations ranging from availability, affordability, and latency, thus, resulting in restricted, expensive, and slow access to even cached content. Thus, known CDN systems have all of the above limitations and technical problems that result in an expensive service and/or poor user experience. More importantly, a consumer has no control over whether their ISP has a CDN node for the services that the user most frequently uses, which is an arrangement restricted between each ISP and the CDN company. In addition to this, what data is cached by each CDN is also dynamic and is determined by the existence of commercial contracts between the CDN companies and internet services/Apps.

Thus, it is desirable to provide a pluggable CDN edge server that overcomes the above limitations of known systems and solves the technical problems of the known CDNs described above and it is to this end that the disclosure is directed.

BRIEF DESCRIPTION OF THE DRAWINGS

FIG. 3 illustrates a method for setting up and using the CDN edge node deployed by a consumer to operate as an active CDN edge of the pluggable CDN system;

FIGS. 5A-5C illustrate an example of a web based management portal that may be used to install/configure the pluggable CDN.

DETAILED DESCRIPTION OF ONE OR MORE EMBODIMENTS

Figure 1:
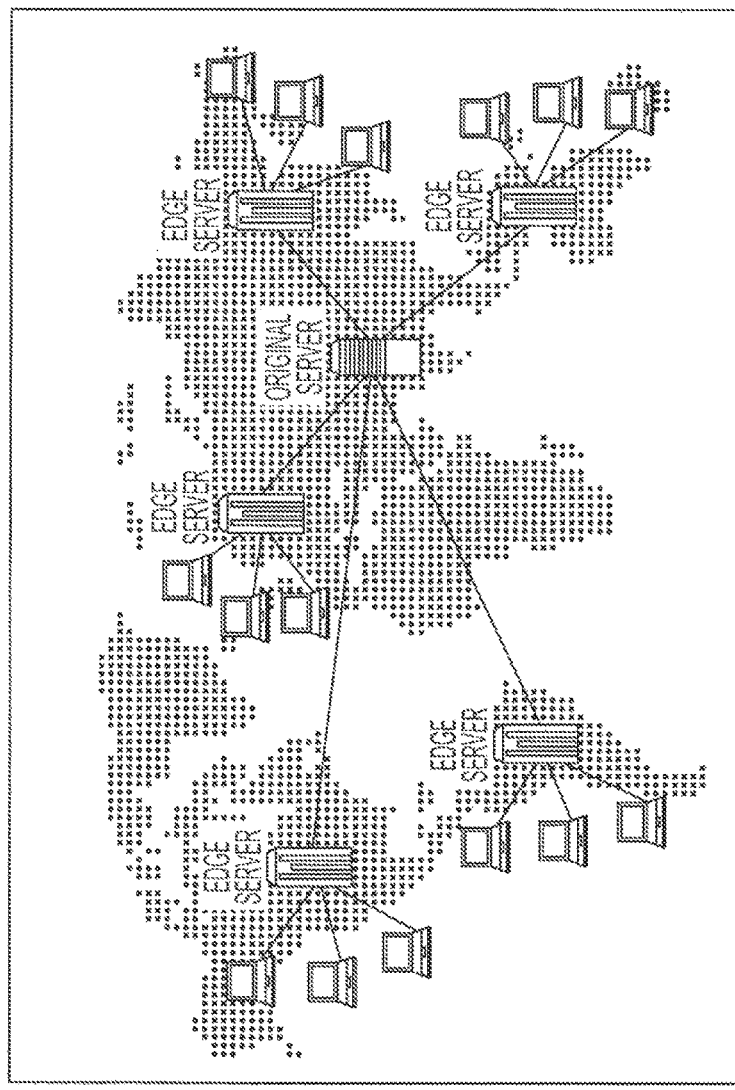
FIG. 1 illustrates a typical content delivery network with an original server and one or more content caching edge servers.

The disclosure is particularly applicable to a pluggable CDN system having the architecture as shown in the drawing and it is in this context that the disclosure will be described. It will be appreciated, however, that the system and method has greater utility since the system and method may be implemented in different manners that are within the scope of the disclosure.

Figure 2:
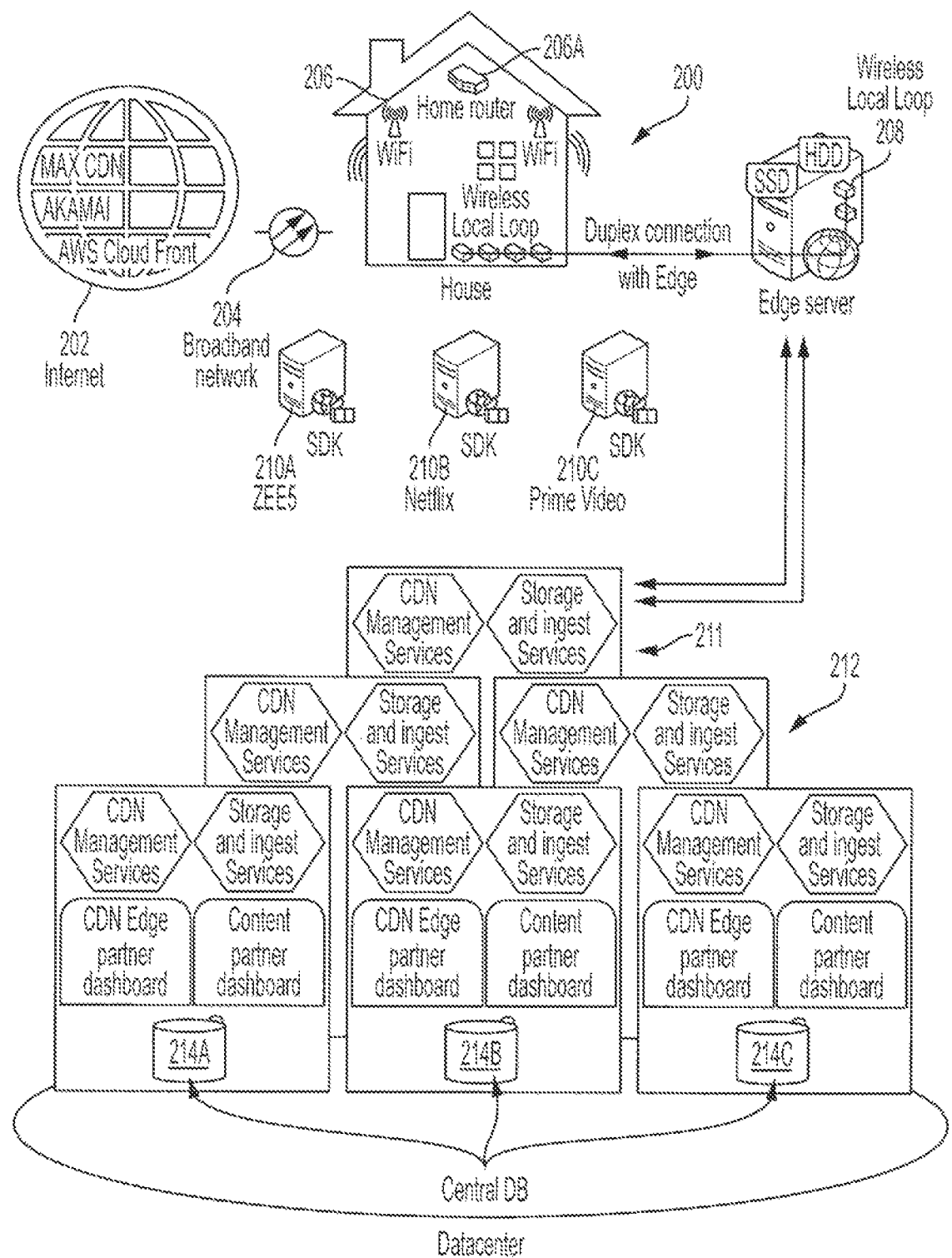
FIG. 2 illustrates an embodiment of a pluggable CDN system and its various components, which can be installed by a consumer as a part of any network.

FIG. 2 illustrates an embodiment of a pluggable CDN system 200 and its various components, specifically in which the edge nodes can be deployed by a consumer. Each of the components reside in their respective places in the ecosystem in one or more different pieces of hardware. As shown in FIG. 2, the system may include a network 202 such as the Internet that is connected by a broadband network 204 to a building 206 (office building, residence, etc.) wherein the building includes wireless local loop network WiFi and a home broadband router 206A that are all known hardware communication devices used in a building. An pluggable CDN edge server 208 (that may be any computer system, such as a server computer or other computer with a processor that executes a plurality of lines of instructions/computer code so that the edge server (or its processor) is configured to perform the pluggable CDN operations) may be connected to the building network and provides the pluggable CDN functions and operations as detailed below to the user(s) of the building.

The system 200 may further comprise one or more software development kits (SDKs) 210A-210C each executed on a computer system with a processor that is configured to perform the operations on each SDK. The system 200 further comprises a content delivery network 212, connected to the edge server 208, that may be located in a data center and may have one or more central databases 214A, 214B, 214C. Note in the pluggable CDN system 200, there may be an edge node 208 at each building or user, each deployed by the building or by the user on their own accord, so that there are a plurality of edge nodes 208 although the operation and components of a single edge node 208 is described below for illustration purposes.

The core components of the system include the home broadband router 206A in the building 206, the CDN Edge node 208 connected to the home broadband router 206A in the building via LAN located in the building 206. As shown in FIG. 2, the system may include internet-based Origins and CDNs 212, such as Stackpath®, Akamai®, Netflix® Origin®, AWS®, etc. The system 200 may include the datacenter programs, services, and storage including in house controller applications and dashboards, in house databases and other storage services and a program to ensure detection of a connected CDN Edge node 208 within a local network. The system 200 may also include partner applications with integrated CDN SDKs 210A-C with end-users connecting to required services via wire/wireless LAN and public DNS server(s).

The home broadband router 206A can be any commodity, like a commercially available wired or wireless router and Access point, which is installed inside the building 206. The client devices within the building that are connected to this router 206A may include mobile phones, tablets, smartphones, personal computers, laptop computers, etc. These devices can make use of the power of the CDN Edge node 208 by using partner applications and services 210A-210C. The home broadband router 206A acts as a gateway between the connected devices such as customer's handheld devices and the CDN Edge Node 208, as the router 206A is responsible for providing I.P. addresses to the clients of the network including the connected devices and the pluggable CDN edge 208.

The home router 206A ensures that there is connectivity between the public Internet 202 and the network clients, including the CDN Edge node 208. The clients use it for their regular networking tasks, whereas the CDN Edge node 208 will use the router 206A to talk to the Data Center's 212 Controller Applications, Dashboards and Partner CDNs, alongside being a part of a local area network (LAN).

The CDN Edge node 208 may be connected to the router 206A via an existing or newly installed LAN in the building

206 that may be hardware (with a processor) that runs the proposed solution's custom software stack by execution of a plurality of lines of instructions/computer code by the processor that is configured to perform the edge server operations. This software stack uses tools and services; such as Service Discovery and Dynamic Content Caching, and also talks to the data center programs to power its internal Push-Pull Hybrid CDN methods discussed below. The edge node 208 may contain commodity components, such as an operating system running over a standard SSD and a huge content-caching disk, which may be a separate HDD or an SSD. This CDN Edge node 208 contains software that maintains the health of the server. One of the health-maintenance tasks include Content and Storage Management service to clear out old and unused content to free up space for fresher and newer content. The software running on the CDN Edge node 208 is also responsible for user management service, registration flows, etc.

The CDN Edge node 208 is part of the pluggable CDN system 200, wherein it reports its own details, such as a unique identifier (often termed EdgeID) and its acquired IP address on the network—so to update the entries in the data center with the same. This is done to ensure that devices on the client network accurately route requests to and via the CDN Edge node 208, whenever required via public DNS systems.

The Internet based Origins and CDNs 212 contain the raw (original) sources of content, wherefrom the caching begins. For instance, when an over the top (OTT) provider releases a new movie or an episode of a Web series, the CDN Edge node 208 may fetch and cache the content reactively or proactively in the Origin server or its successive CDNs.

Internet-based systems can only be used with strong broadband connectivity, but may often have reliability issues. The CDN Edge node 208 has intelligent caching techniques to improve on the performance of standard broadband connections, which will ensure that relevant content is available for customers when they need it.

As the name suggests, Origin servers of the CDN go through a lot of throughput and load balancing being at the top of the content supply chain. The greater the load over the Origin servers of any service, the greater would be the latency, and the poorer will be the quality of service.

A datacenter 211 (that includes the CDN 212) has programs, services, and storage that consists of services that power and drive the entire enterprise. A CDN service dashboard located in the data center 211 may be responsible for the management of CDN Edge nodes 208 and the control of certain aspects of the CDN Edge servers 208 via remote configuration methods. The CDN service dashboard may be an internal tool to ensure that each CDN Edge server 208 has acceptable uptimes and to track any issues that may arise.

The Storage and ingest services in the datacenter 211 may be used to fetch and store content from Partner content providers, and will ensure that copies of their content are available beforehand in order to be able to "push" them out to CDN Edge servers 208. Storage services will also be responsible for handling Object and Block Storage servers, space management and recycling algorithms over multiple systems.

The content partner dashboards in the datacenter 211 may be exposed to Content partners in order to manage specialized content on the CDN Edge servers 208. Partners may customize the usage of this Dashboard as per their liking, such as scheduling to push or erase certain content from CDN Edge servers 208 at predefined times or blacklisting/whitelisting certain content from predefined geographical locations.

The central databases 214A-214C are infrastructure at the heart of the entire backend system, wherein structured/unstructured data, metadata powering the entire enterprise is stored. These DBs 214A-214C may power multiple services running on top of it, such as the Dashboards. Among a lot of other things, it shall be responsible for storing activations/deactivations, uptimes, and other such data about CDN Edge servers that are part of the network.

The datacenter 211 may execute CDN Edge node detection software that may be executed by a processor in the datacenter that is configured to execute a plurality of lines of instructions/computer code. This may be a program or a set of programs, which will identify CDN Edges 208 inside a local area network (LAN) or otherwise (depending on the use case) of each building. A use case would be—a partner mobile application, upon launching, asking this service whether it is connected to any CDN Edge node over the local network. If yes, then the partner mobile app can use it, instead of the Internet based Origins/CDNs.

Partner applications that are part of the pluggable CDN system may be integrated with CDN SDKs 210A-210C. The CDN SDKs enable certain functionalities, such as local CDN Edge node detection, intelligent traffic routing algorithms/APIs the Content Partner Apps can use for accessing content/services available locally.

The SDKs 210A-210C are published as authenticated binary software packages along with robust documentation and guidance in order to ensure smooth implementation and easy onboarding of content partner applications. These SDKs contain platform/language APIs, which can be invoked by the partner Apps in a reactive manner, with decision-making logic of their own. A prime use case (among many) would be—upon application launch for an OTT application, the SDK will detect and notify the OTT partner application about the existence of an active CDN Edge server 208 which can be utilized by transmuting CDN playback URLs for superior playback experience and minimizing public Internet usage.

The Public DNS server(s) resolves a human readable domain into a machine readable IP Address. The IP addresses can be local private IP addresses or public IP addresses that point to physical nodes. A public DNS server with local entries, ensures that customers with a Local CDN Edge node 208 in their LAN, get their DNS Queries resolved correctly to their local CDN Edge node 208 without any extra network manipulations or technical know-how. Post activation of a CDN Edge node in their LAN, the requisite details will flow back to the proposed solution's data center programs. The information will then be used to update and maintain the private and public addresses of each CDN Edge node 208, so to be able to serve them via the proposed solution's public DNS server(s).

In the pluggable CDN system 200, each user can practically install a CDN Edge node 208 within their local WiFi or wired network at their premise 206. Once installed, the CDN Edge node 208 starts caching or storing any data that is requested so that future requests for that data can be served faster and for free. By storing the data right at the premise of the users, an active Internet connection is not necessitated for subsequent requests of any data that has already been earlier requested. The local area network (LAN) of the premises 206 may be used to serve that data to the users within the premises 206.

Caching data at such a hyperlocal level has two distinct advantages which are that no active Internet connection is persistently required and data is delivered much faster. One advantage of not requiring an active Internet connection is lower Internet bills. A group of users can avoid paying higher Internet bills on account of high data consumption for using the Internet to download the same content that has earlier been requested by any of the members in the group. Also, users can perform their regular digital activities even while staying offline—without having to wait to be back online—in case their Internet connection is patchy or weak. Another advantage of using the LAN over the Internet is having extremely high-speed data transfer, and this is possible because the data that is being delivered is stored in the same premise and is being delivered using the free and abundant LAN. As more requests for various information are made over time, the more information is cached in the pluggable CDN, resulting in a wider information pool-base. Thus, more requests can be served from the cache. The more the number of requests that can be served from the cache, the faster would be the users' system performance. The ability to serve content from the edge node while the Internet connection to the premises does not exist or is spotty is a technical solution that solves some of the last mile technical problems identified above.

Once the CDN node 208 is installed within the local Internet network of a user, a connection has to be made from it to the traditional CDN backbone, which serves that location. The pluggable CDN 208 then starts acting as an active CDN Edge node, operating out of the user's premise 206. The edge server 208 optimizes data-throughput and bandwidth-utilization of the network that the end-user is connected to (which is the last mile). The pluggable CDN 208 connects to the nearest traditional CDN server to fetch new content and cache it when Internet connection is available. The pluggable CDN 208 caches all static content. Static content is any content that has future value for repeated consumption; like a movie, or a TV series, or music.

The solution uses SDKs to provide access to the functionality of utilizing the CDN Edge node 208 and will need to be integrated within applications that require support for such functionality. Currently, SDKs are available for all supported app categories, including but not limited to OTT applications, social media applications, music streaming services, news services, App and Play Store, gaming, and others.

The pluggable CDN 208 can have at least two exemplary use cases. A first use case is by an individual user in which a user orders a pre-configured plug-and-play CDN Edge node 208, turns on the device and then connects it to the Internet. Users can opt to configure the node themselves, too. A second exemplary use case is for a community of users in which users residing in the same residential complex or locality can form a community and order a plug-and-play CDN Edge node 208. The community sets up the CDN node 208 for their community usage.

Figure 5B:
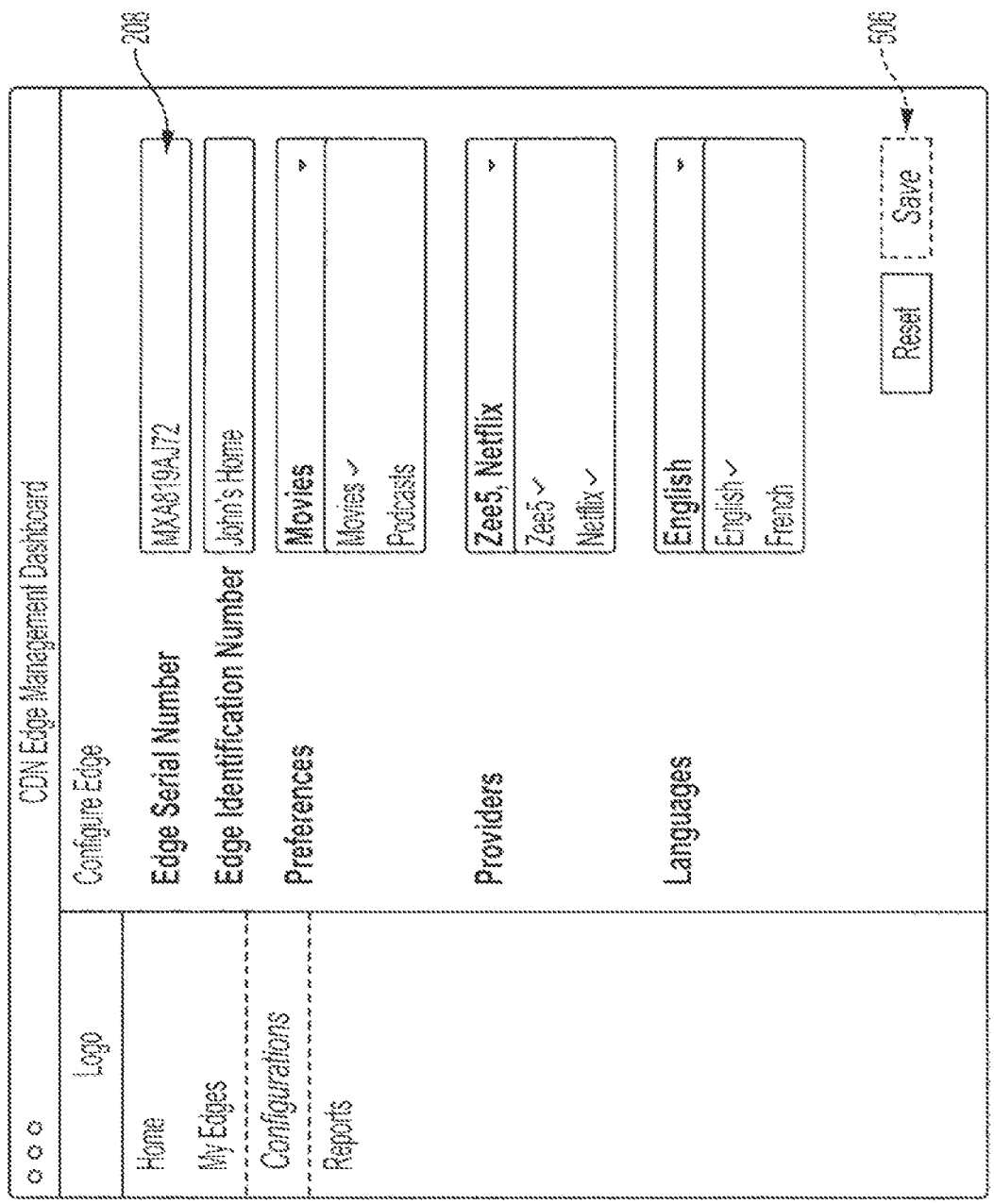
Figure 5C:
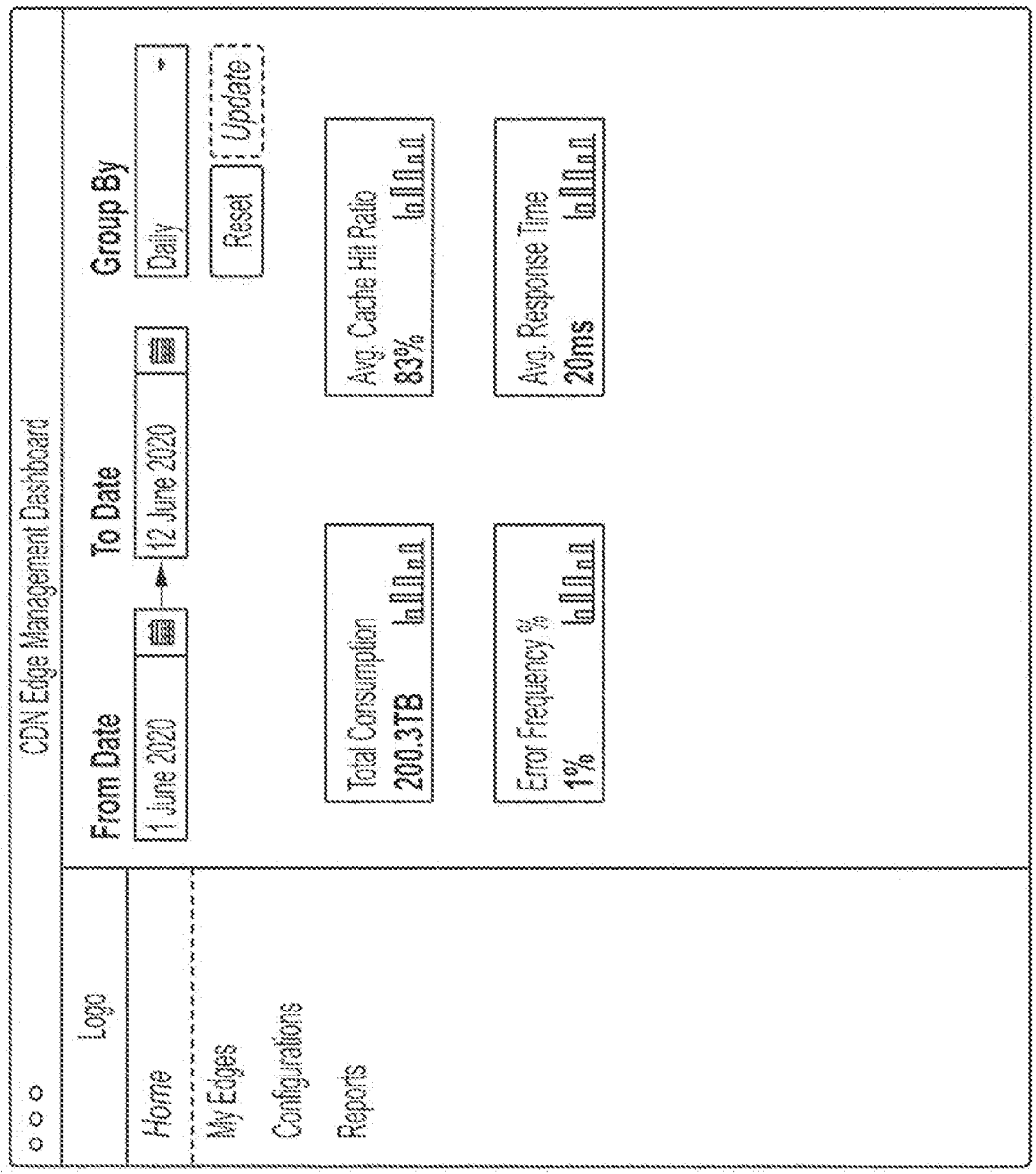

The setting-up process involves registration via a digital console (Web site/App) and doing the necessary configurations to make the plug-and-play CDN ready for working as an active CDN Edge node. FIGS. 5A-5C illustrate an example of a web-based management interface that may be an application residing at the data center 212 that can be utilised by each user who is installing and managing these pluggable CDN Edges 208. FIG. 5A shows an interface 502 by which the user can configure the new pluggable CDN and its network details. FIG. 5B illustrates an interface 506 so that the user can configure the content preferences, the content provider preferences and the language preference. FIG. 5C illustrates an interface that shows the characteristics of the pluggable CDN like total data consumption or error frequency. With such an interface, users can register the Edge they possess which will be verified with its serial number that will be known to the backend and Edge itself. This interface will also allow people to manage their configuration like content preferences, providers list, etc.

By caching the content at a node located right at the user's premise, the pluggable CDN ensures end-users of ready delivery of any future requests for the same content, even during times when the Internet connection is poor or absent altogether. Thus, users would not experience any disruption in their regular digital activities despite having a weak or intermittent Internet connection. In case of community usage, the community would not be charged on account of data consumption for future instances of downloads of a once-downloaded content, thus sparing them from paying higher Internet bills. For example, if a movie has already been downloaded and watched by a member of a community, if and when any other member of that community wants to watch the same movie, he or she would not require an active Internet connection, but can stay offline and watch the movie.

FIG. 3 illustrates a method 300 for setting up and using the CDN edge node of the pluggable CDN system. Initially, a customer either purchases a CDN Edge node that is pre-configured or configures their own (302), using commodity storage and computer hardware. In case the user configures their own, they need to complete the registration and configuration processes using a registration/login form. Once the CDN node is installed and configured, it connects itself to the local LAN and the Internet and the CDN Edge node starts working as a network-level caching appliance (304). The CDN edge node may then check for availability of data to be cached (306). For example, the SDKs that are available for the various supported app categories detect the availability of a CDN Edge node on the network and announce the availability of data for their respective services to the CDN node, so the CDN knows that new data is available and starts caching them. The pluggable CDN node uses a hybrid of push-and-pull CDN methodologies as discussed below in more detail. Once cached on the CDN Edge node, the SDKs intelligently route (308) all future requests for the same data via the locally available CDN Edge node. Even when the network doesn't have Internet connectivity, the data cached on the CDN Edge node can be accessed and consumed (310), which is again managed by the SDKs. Users will be able to continue using the cached data for all supported Apps, using their local Wi-Fi or wired network.

The edge node 208 for each customer/user of the pluggable CDN system may be a hybrid push/pull-based CDN. Typical CDNs function in two ways: Push-based and Pull-based. For a push-based CDN, content is proactively shared with Edge servers at designated CDN locations and the Web content is automatically populated in the CDN closest to the end user's location. So when the end-user sends a request for an asset, the CDN already has it proactively cached to be delivered seamlessly to their requesting computing device. In the case of a pull-based CDN, no proactive distribution of resources is performed. When the end-user sends a request for content the CDN "pulls" it down from the nearest edge server or the Origin Server. All the content is cached in one place and the CDN does the work to pull it down into the end user's computing device, along with caching the same for itself for future requests in real-time.

In the hybrid push-pull approach, a sophisticated user-behavior pattern analysis will determine what gets cached next on the local CDN node 208. For example, if a daily soapopera program is frequently streamed across a CDN node by a partner application, this regular streaming of the daily soap will form a strong basis for proactively fetching all new episodes of that soap, via a push-based mechanism. The CDN user's content preferences set on the management interface, user's consumption behaviour learnt from data collected from Edge and SDK would actively determine the content fetched/pushed and stored for him/her/them to watch, next. If a certain content is being hyped and marketed well in a geographically proximal location, then streaming that content as fast as possible by the network in order to reduce drop-offs for the same, would make a lot of sense. In this case, the backend would assign content to the CDN servers proactively, disregarding or not providing due weightage to the CDN user's actual behaviour across partner applications. Like regular pull-based CDNs, caching assets begin caching relevant content in real-time as soon as a user begins consuming a certain content as close to them as possible.

Figure 4A:
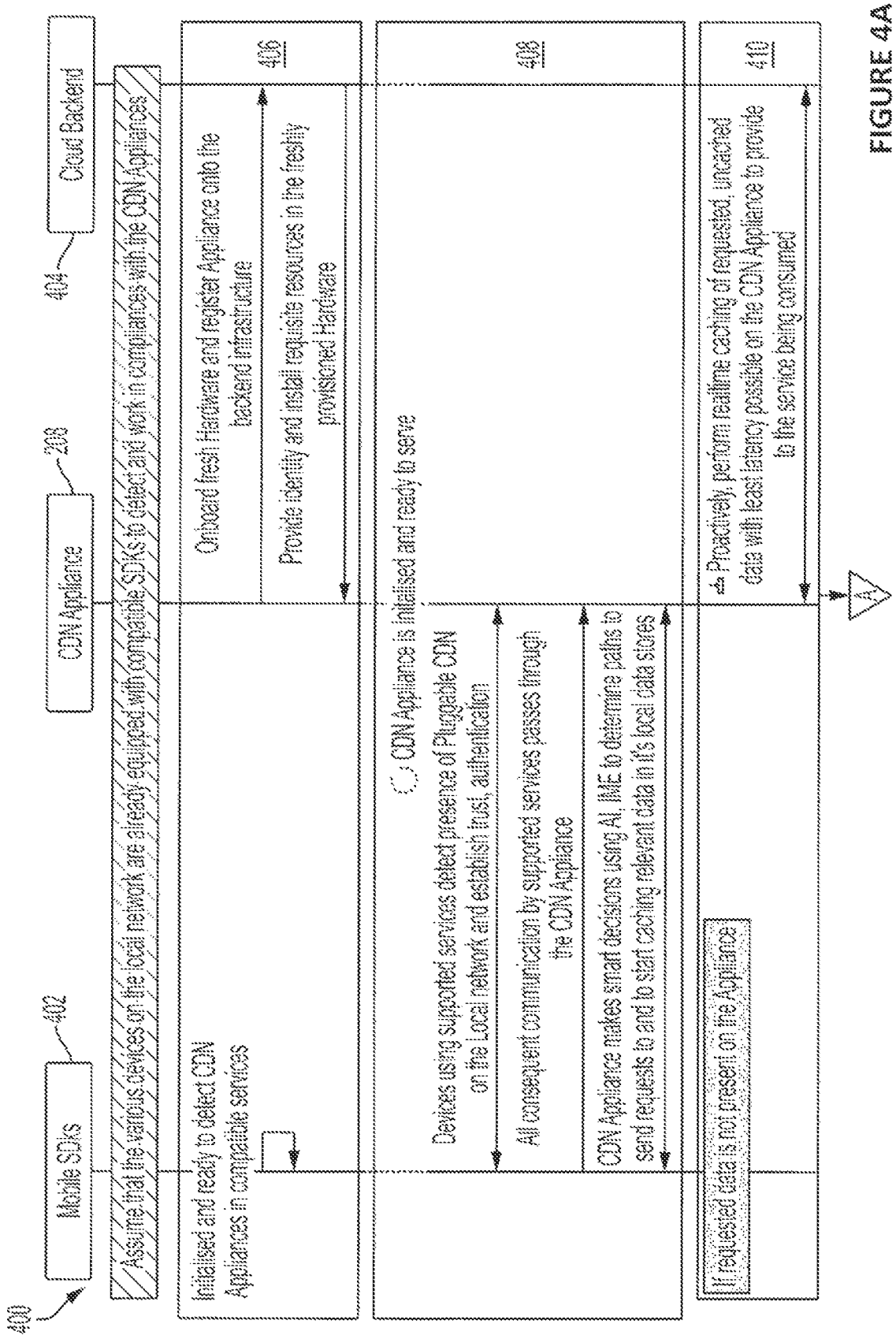
FIGS. 4A and 4B show a method for content delivery using a pluggable CDN.
Figure 4B:
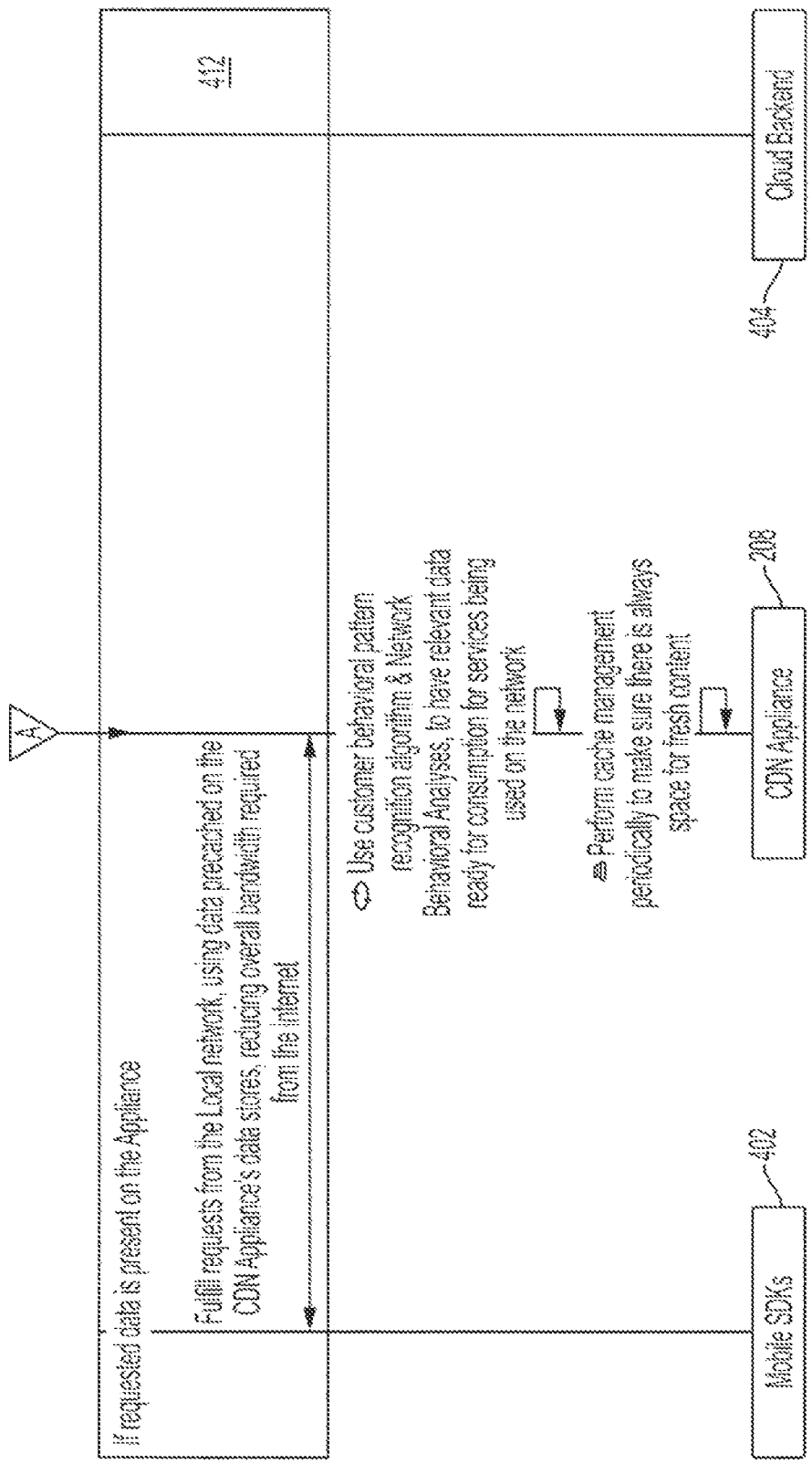

FIGS. 4A and 4B show a method 400 for content delivery using a pluggable CDN with data interactions between the mobile SDKs 402 (discussed above), the CDN edge node 208 and the pluggable CDN cloud backend 404. To achieve the proposed solution, a few services are required in the background and FIGS. 4A and 4B shows the workflow of how a pluggable CDN functions. The CDN is already configured for the network as discussed above so that it is detectable by the compatible SDKs inside Partner Applications. The workflow may involve a CDN node initialization process 406 in which the mobile SDKs are initialized and ready to detect the CDN node 208. The CDN node 208 may then register itself with the backend 404 and the backend 404 may provide a unique identity for the new CDN node 208 and install regularly requested resources in the newly provisioned CDN node 208.

The workflow 400 may include CDN operation process 408 in which the CDN node 208 is ready to serve data/content. When the CDN node is ready, devices using supported services detect the presence of the edge node 208 on the local network establish trust and get authenticated. Then, all subsequent communications about data/content requests pass through the edge node 208. The edge node 208 makes smart decisions using AI/ML to determine paths to send requests to and start caching relevant data is local storage. In one embodiment, the AI/ML algorithm may process input data like tags of the consumed content, consumption pattern like frequency, repetition, content metadata, user demographics, etc and may generate models of consumer behavioural patterns. The models allow the system to obtain a predicted content list to be cached at the local storage.

Once the edge node 208 is active, the user may make a content/data request. If the requested data is not present in the edge node 208, a process 410 is performed in which the edge node 208 performs proactive real-time caching of requested uncached data with least latency possible as shown in FIG. 4A. If the requested data is present on the edge node 208, a process 412 is performed as shown in FIG. 4B. In the process 412, the edge node 208 fulfils the requests from the local storage.

In the workflow, the edge node 208 may also use customer behavioural patterns recognition processes and network analysis to have relevant data ready on the edge node 208. For example, assuming there is a customer living in a metropolitan area who is consuming content for 2 hours a day on this Pluggable CDN platform, the system may collect usage details like duration, content identifiers (IDs) consumed, content metadata, repetitive consumption and/or user demographics. This whole dataset would then be processed by the AI/ML algorithm described above, and converted into data model. For example, if this consumption data indicates that the consumer has watched animated comedy shows such as "Family Guy", the system can safely assume that it can recommend other animated comedy shows such as The Simpsons, Futurama, Rick and Morty, etc.

The edge node 208 may also perform cache management to make sure that there is room for fresh/new content using various algorithms whose variables may include consumption duration, content ids consumed, content metadata, repetitive consumption and/or user demographics.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
a content delivery network that caches and delivers content to a plurality of edge nodes including a pluggable edge node;
the pluggable edge node, installed at a premises of a user by the user, that is connected to a local network in the premises, wherein the premises has an internet connection separate from the connection to the pluggable edge node;
wherein the pluggable edge node is connectible to the content delivery network using self-configuration by a user through a web-based management interface and the internet connection of the premises; and
the pluggable edge node caching data for each user at the premises and serving data cached on the pluggable edge node to each user at the premises over the local network without requiring internet connectivity for the premises.

2. The system of claim 1, wherein the pluggable edge node uses hybrid caching.

3. The system of claim 2, wherein the pluggable edge node caches data when a connection to the content delivery network over the Internet connection of the premises is available.

4. The system of claim 3, wherein the pluggable edge node is configured to pull data from the content delivery network that is not already cached in the pluggable edge node.

5. The system of claim 3, wherein the pluggable edge node is configured to proactively cache data from the content delivery network.

6. The system of claim 5, wherein the pluggable edge node is configured to proactively cache data from the content delivery network in response to user behavior.

7. A method comprising:
installing a pluggable edge node at a premises of a user by the user wherein the pluggable edge node is connected to a local network in the premises, wherein the premises has an internet connection separate from the connection to the pluggable edge node so that the pluggable edge node is connectible to the content delivery network using the internet connection of the premises;
connecting the pluggable edge node to a content delivery network using a self-configuration by a user through a web-based management interface;
caching, on the pluggable edge node, data for one or more users at the premises; and
serving, by the pluggable edge node, data cached on the pluggable edge node to the one or more users at the premises over the local network without requiring internet connectivity for the premises.

8. The method of claim 7, wherein caching the data on the pluggable edge node further comprises using hybrid caching.

9. The method of claim 8, wherein caching data further comprises caching data on the pluggable edge node when a connection to the content delivery network over the internet connection of the premises is available.

10. The method of claim 9, wherein caching data further comprises pulling, by the pluggable edge node, data from the content delivery network that is not already cached in the pluggable edge node.

11. The method of claim 9, wherein caching data further comprises proactively caching, on the pluggable edge node, data from the content delivery network.

12. The method of claim 11, wherein proactively caching the data further comprises proactively caching data from the content delivery network in response to user behavior.

* * * * *